United States Patent
Shimoda et al.

(10) Patent No.: US 6,212,644 B1
(45) Date of Patent: Apr. 3, 2001

(54) CONTROLLING TEMPERATURES IN COMPUTERS

(75) Inventors: Marion H. Shimoda, Aloha; Kelan C. Silvester, Portland, both of OR (US); Gunjeet Baweja, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/265,648

(22) Filed: Mar. 10, 1999

Related U.S. Application Data

(63) Continuation of application No. 09/150,592, filed on Sep. 10, 1998, now abandoned.

(51) Int. Cl.$^7$ ........................................... G06F 1/32
(52) U.S. Cl. ............................................. 713/324
(58) Field of Search ................................. 713/300–346

(56) References Cited

U.S. PATENT DOCUMENTS

| | | | |
|---|---|---|---|
| 5,940,785 | * | 8/1999 | Georgiou et al. ..................... 702/132 |
| 5,944,831 | * | 8/1999 | Pate et al. .............................. 713/324 |
| 5,951,689 | * | 9/1999 | Evoy et al. ............................ 713/322 |

* cited by examiner

Primary Examiner—David A. Wiley
(74) Attorney, Agent, or Firm—Trop, Pruner & Hu, P.C.

(57) ABSTRACT

A system for controlling the temperature inside a computer system housing involves determining whether a predetermined temperature set point has been exceeded. If the temperature set point has been exceeded, corrective action is attempted without adversely affecting the performance of the computer system. This may be accomplished by determining whether there are unused devices which are consuming power. If so, these devices may be transitioned to a lower power consumption state which may correspond to a lower heat generation state as well.

29 Claims, 4 Drawing Sheets

CONTROLLING TEMPERATURES IN COMPUTERS

This is a continuation of U.S. application Ser. No. 09/150,592, Sep. 10, 1998 now abandoned.

BACKGROUND

This invention relates generally to computer systems and particularly to controlling the temperature inside the housings of those computer systems.

As the demands on computers increase while housing size decreases, internal temperature is becoming an increasing concern. These internal temperatures can have destructive consequences. Excessive temperatures can damage both electrical and structural components. In addition, higher temperature means that more expensive electrical components may be necessary, increasing the cost of the computer system.

While the easiest solution to the temperature problem may be to slow a component to reduce its consumption or simply to shut the computer system down for a period of time, these approaches may unduly interfere with the users' appropriate operation of the computer system. Thus, approaches of this type are undesirable because they decrease the performance of the computer system.

Thus, there is a need for techniques for preventing temperature excursions without unduly affecting system performance.

SUMMARY

In accordance with one embodiment, a method for controlling a computer system includes determining whether a temperature set point has been exceeded. If the set point has been exceeded, the method involves determining whether a first device is being used. If the first device is not being used, a determination is made as to whether the first device is consuming power. If so, that device is powered down.

DETAILED DESCRIPTION

Software may be utilized to control temperature excursions in a computer system. Using a software based approach has many advantages over purely hardware based approaches. Software can accommodate a variety of circumstances and can adapt to particular needs which may change over time in the course of system operation.

In one embodiment, a software based solution may include software at the device driver layer to control various hardware elements. Such an approach can achieve high performance while preventing damage from thermal overload.

Figure 1:
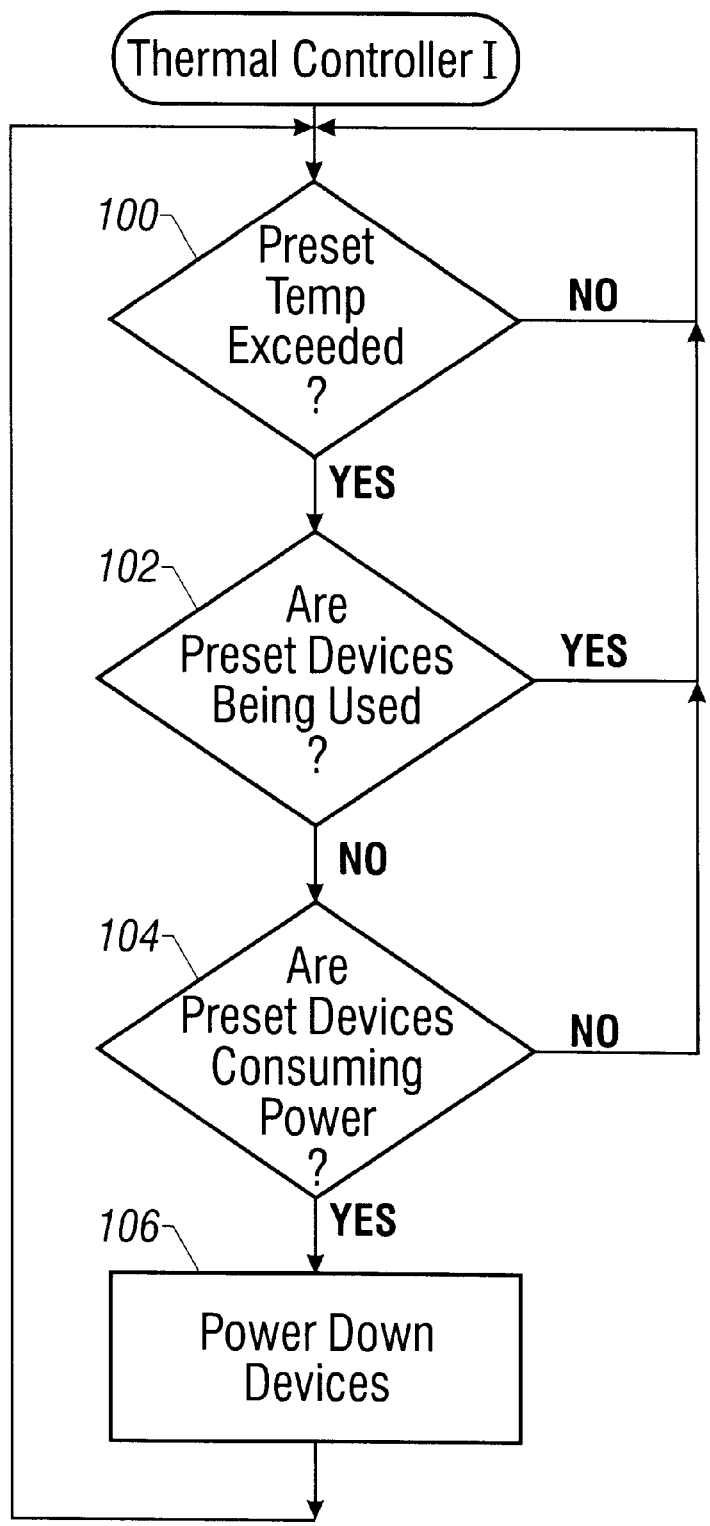
FIG. 1 is a flow chart showing one embodiment of the present invention.

Referring to FIG. 1, thermal controller software initially checks to determine whether a preset temperature limit has been exceeded. This temperature detection can be done using conventional temperature detection hardware. A number of temperature detectors may be utilized in a variety of different locations within a computer housing and the check (diamond 100) may involve checking each of those detectors. A global temperature correction may then be implemented or the temperature correction can be implemented on a local scale proximate to the particular temperature detector which has recorded a set point being exceeded.

If the pre-set temperature is exceeded, another check determines whether certain devices are being used (diamond 102). As used herein "devices" refers to heat producing devices or subsystems that consume power. A database may provide information about devices which may generate excessive temperature even when they are not being utilized. An example of such a device is a hard disk drive which may spin the disks even when no read or write operations are occurring. In addition, some graphics chips may generate excessive heat even when they are not actively being used. Similarly, battery chargers may generate heat as they continue to charge batteries in portable computers, in some cases, even when the computer is actually connected to an AC adapter and the battery charger is not essential.

One convenient way to determine whether the heat producing devices contained in database are being used is to use the functions made available through the Advanced Configuration and Power Interface (ACPI) which is provided, for example, in Microsoft® Windows® 98 operating systems. See the Advanced Configuration and Power Interface Specification, Revision 1.0 , Dec. 22, 1996. The ACPI includes Application Program Interfaces (API) which provide information about whether devices are powered on. In addition, ACPI provides information about the power consumption state of the devices. Most devices have more than one power consumption state. ACPI defines four device power states: D3 or off, D2 which saves more power than D1, D1 which saves less power than D2, and D0 or fully-on.

Thus, information can be gained using the existing ACPI capabilities to determine whether any one of the devices contained in the database is actually operating, or whether in fact it is unused. Of course, the same type of APIs used for power consumption determination reasons in ACPI can be used without ACPI to implement an embodiment of the present invention.

The ACPI compliant operating system uses a get power status method to determine the current power configuration including the device power status. A device signals a System Control Interrupt (SCI) to inform the operating system of changes in device power status. To determine a device's current power state, an ACPI driver runs a control method (supplied in the device's entry in the Differentiated Definition Block per the ACPI, specification) which reads from the appropriate registers to determine the device's power state.

Next, an inquiry determines whether the unused devices are consuming power (as indicated in diamond 104). In some instances this information may be known based on the nature of the device. In those cases the information may be obtained from the database described above. For example, it is known that hard disk drives and graphics chips have power requirements even when not actively used, as noted above.

If this information can not be determined based on the nature of the device, the ACPI functionality may be used to determine this information. Based on the power state information developed by ACPI, the software determines if the device is using power. If possible, the unused power consuming, heat generating devices are powered down (block 106).

"Powered down" is not intended to necessarily be limited to turning a device off. In some cases, it may be sufficient to cause the device to transition from a higher power consumption state to a lower power consumption state. This may be sufficient to reduce the temperature generation to acceptable levels. For example, a device may be transitioned from state D1 to state D2, both of which are operating power on states.

In some cases, additional checks can be made after successive delays to determine whether it is necessary to power the device down to still a lower consumption state. Iterative checks can iteratively check whether additional devices should be powered down. Again, the power consumption states may be obtained from existing ACPI information or, for example, may be generated by an equivalent technique.

While device power consumption states are utilized in connection with the present invention, the control of power consumption is a distinct operation from what is intended in connection with the present invention. Power consumption relates to how much power the computer system actually utilizes. This has environmental and cost consequences. The present invention aims in some embodiments to use power consumption technology to control temperature and therefore to prevent damage through excessive temperature excursions.

Figure 2:
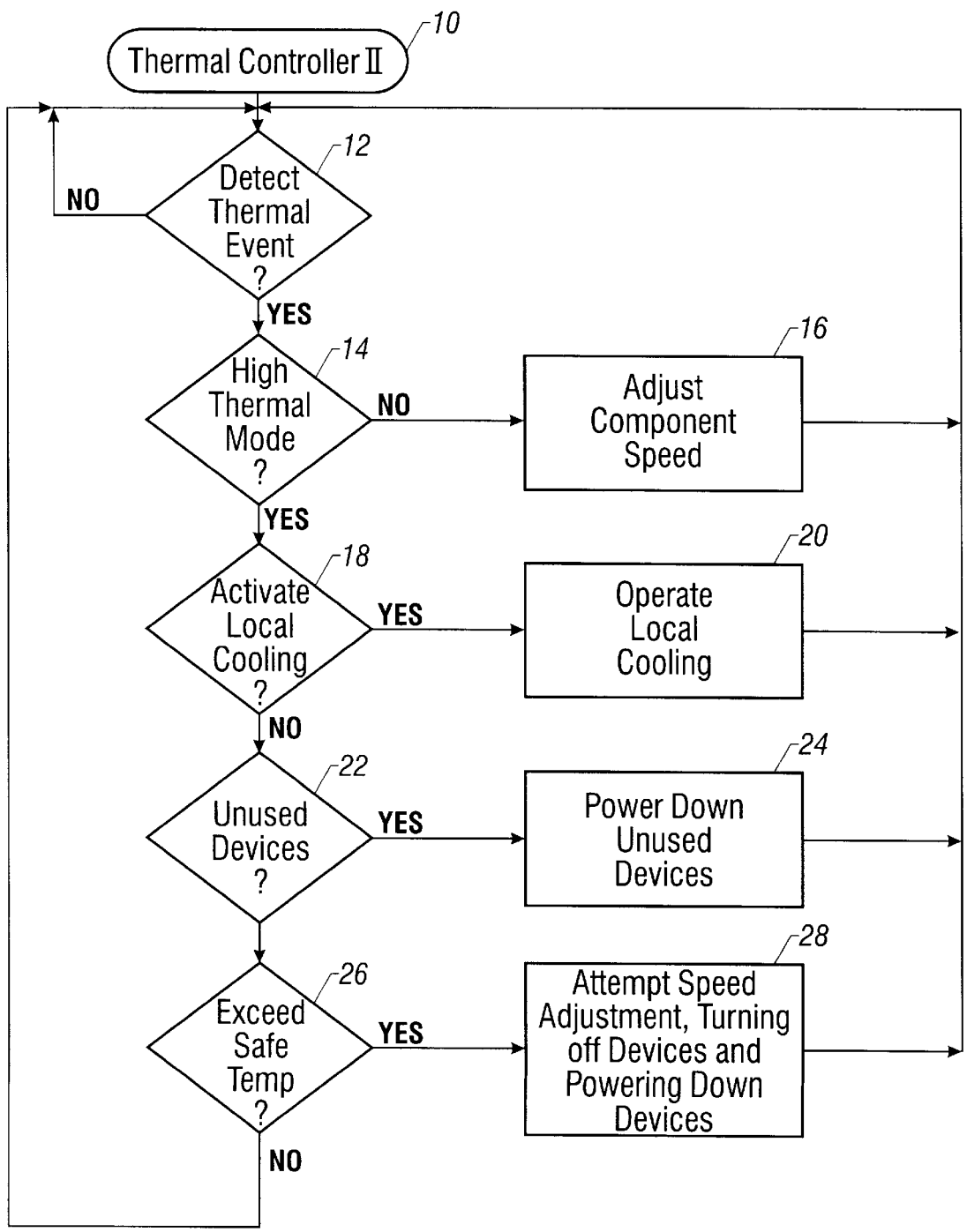
FIG. 2 is a flow chart for another embodiment of the present invention.

Referring now to FIG. 2, another version of the thermal controller software 10 may initially determine (block 12) whether a thermal event, generated in response to an over-temperature condition, has been detected. If so a check is made at diamond 14 to determine whether the particular component is operating in a high thermal mode where heat is being generated. If not, the component's speed may be adjusted (block 16) to reduce the temperature generation. However if the device is operating in a high speed mode, powering the device to a lower speed may be unacceptable.

In such cases, a check at diamond 18 determines whether a local cooling device can be activated. A local cooling device would be operated to provide active cooling, in the case where a local temperature excursion has been detected and a particular cooling device is proximate to the location of the temperature excursion. In cases where only one global temperature detection operation is done, then correspondingly the local cooling operation would involve whatever cooling device, such as a fan, is available anywhere inside the computer housing.

If it is possible to activate an unactivated cooling device, the device may be activated (block 20) and the flow may return to the beginning. A delay may be implemented before determining whether or not the correction has been effective.

If it is not possible to use additional cooling, a check (diamond 22) determines whether there are heat generating devices which are unused. If so, these devices may be powered down or cycled off (block 24).

Otherwise a check (diamond 26) is made to determine whether a safe temperature has been exceeded. If not the flow returns to the beginning without taking any further corrective action. In the case where a safe temperature has been exceeded, an adjustment (block 28) of component speed, such as processor speed, may be undertaken. In this case, unless the processor speed is absolutely essential, processor speed may be reduced to prevent damage. If it is not possible to reduce processor speed, for example because the processor is operating at a relatively low speed already, nonessential devices may be turned off. In addition a check may be taken to determine if other devices can be powered down.

Whether a device is essential may be determined from a database and from its current power consumption state, obtained for example from the ACPI. If it is impossible to turn off any nonessential devices, for example because no such nonessential devices can be found, it may then be necessary to shut the computer system down.

Generally, the thermal controller software may not allow a device that has been powered down for thermal reasons to turn back on when a safe temperature has been exceeded. Thus, the software may prevent the device from powering up even if there is a request for that device to complete a task.

Figure 3:
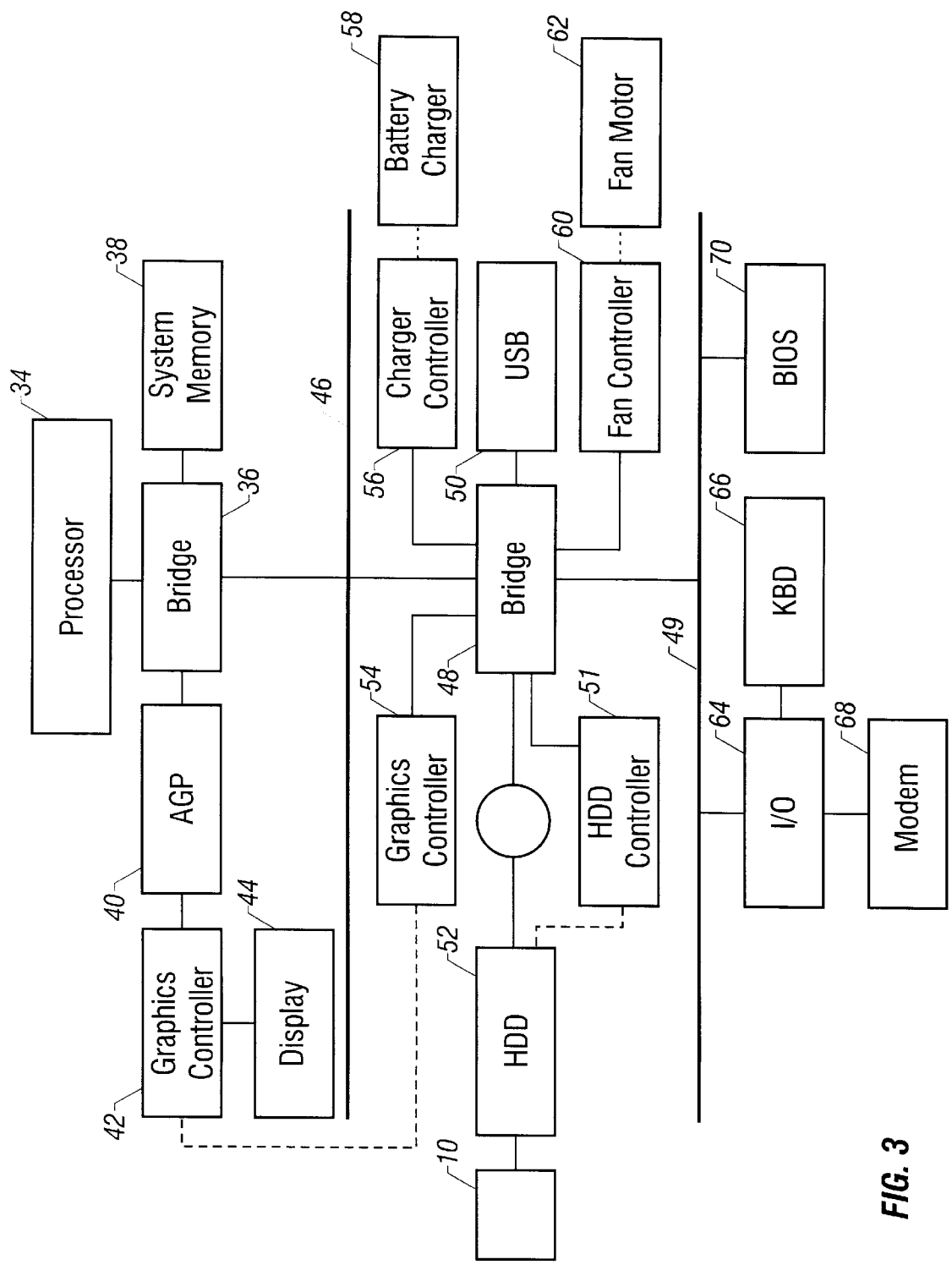
FIG. 3 is a block diagram of one embodiment of a computer which may use the software shown in FIGS. 1 and 2.

An exemplary computer system, shown in FIG. 3 which may implement the software described previously, includes a processor 34 coupled to a bridge 36. The particular embodiment illustrated uses an accelerated graphics port (AGP) 40. AGP 40 connects to a graphics controller 42 which may in turn connect to a display 44. The bridge 36 also connects to a bus 46. The bus 46 may connect to a bridge 48 which may connect, in turn, to a bus 49.

The bridge 48 may couple a plurality of devices including a Universal Serial Bus (USB) port 50 and a plurality of controllers for controlling various devices such as the charging controller 56, the fan controller 60, a hard disk drive controller 51 and a graphics controller 54. Each of these controllers may be operated under the control of the software described previously to generate a sideband signal, for example, over the dotted line paths in FIG. 3 to control the operation of a heat generating device such as the graphics controller 42, the hard disk drive 52, a fan motor 62, or a battery charger 58.

The bus 49 may couple an input/output interface 64 which, in the exemplary embodiment, is coupled to a keyboard 66 and a modem 68. A basic input/output system 70 may be provided on the bus 49 as well.

Figure 4:
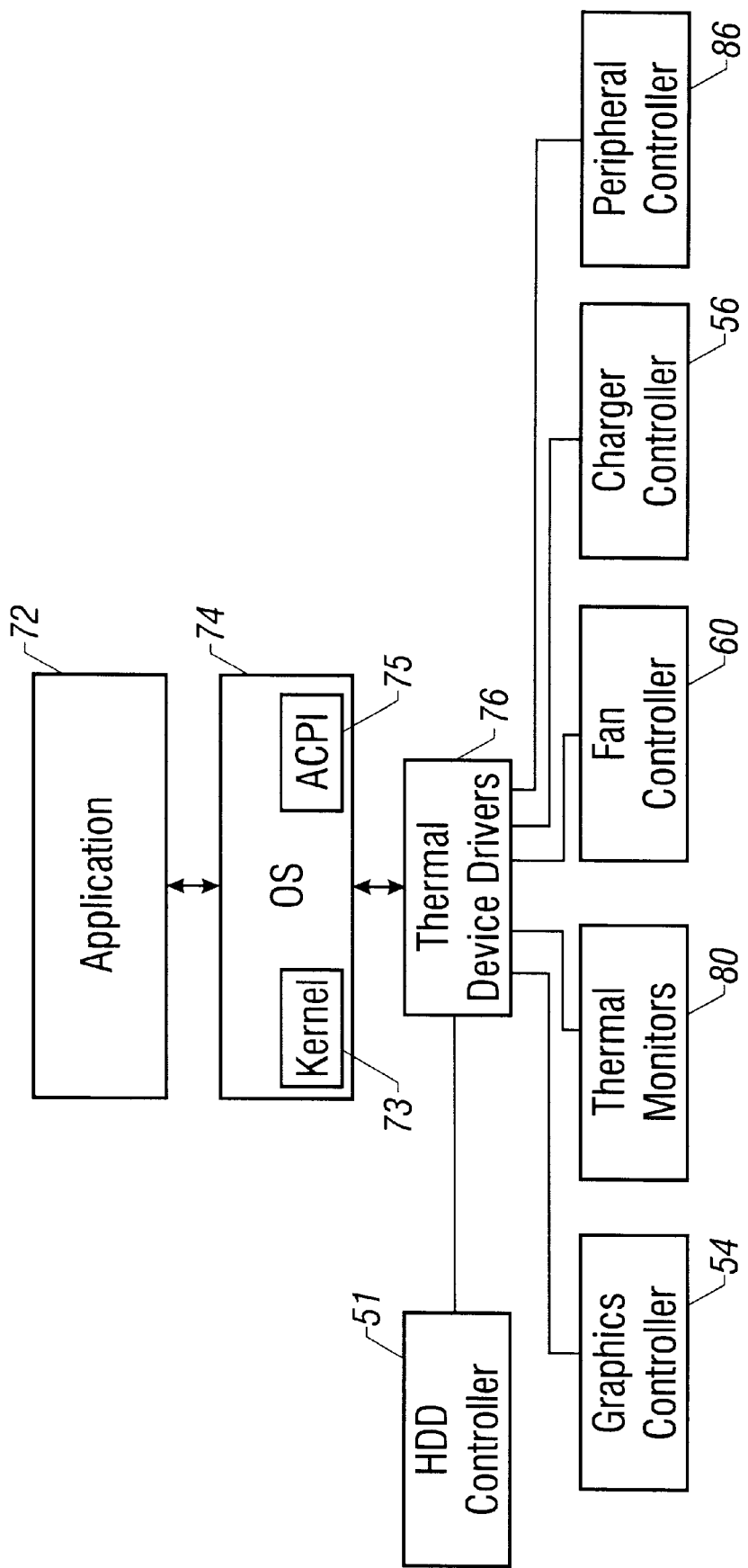
FIG. 4 is a conceptual depiction of the software for controlling excessive temperatures in computer systems in accordance with FIGS. 1 to 3.

The software utilized to control the temperature may operate at the device driver level, as illustrated at FIG. 4. An application 72, running at ring 3, may communicate with an operating system 74 such as Microsoft® Windows® 98 which includes a kernel 73 and the ACPI 75. The thermal device driver software 76 communicates with the operating system 74 and with a variety of controllers. The controllers are coupled to various hardware devices. In response to signals from the thermal device driver software, the heat generation caused by those devices may be controlled.

In particular, the thermal drivers 76 may check with the operating system kernel 73 before powering down a particular device. The operating system may require that a particular device remain fully operational. The operating system then either signals that the power down cycle may occur or that it should be delayed or avoided. If the power down cycle is vetoed by the operating system, another device may be identified for power down.

For example, in the illustrated embodiment, a hard disk drive controller 51, a graphics controller 54, a fan controller 60, a battery charger controller 56, and a peripheral controller 86 may all be connected to various hardware devices to control their heat generation state in response to set point excursion information from temperature monitors 80. This means either that the devices may be powered "on" or "off", or in connection with an embodiment using ACPI, they may be transitioned between three operating power consumption states in order to reduce temperature.

The detection of a thermal excursion can be accomplished in a variety of ways. For example a plurality of temperature sensors may be polled in a desired pattern to determine whether a temperature set point excursion is detected.

Alternatively, the temperature sensors can generate an interrupt which is handled by an interrupt handler. When the interrupt is detected, the software can determine an appropriate course of action to control temperature.

The temperature correction software may be provided in a variety of different formats. In one advantageous format, the software may be part of an operating system. In other embodiments, it can be provided as stand alone software at the device driver layer which works with the operating system.

Instead of using an ACPI function, a hardware adaptation layer (HAL) could be used. In this way custom software can be provided to implement the device driver functionality desired herein without necessitating the power consumption features provided in, for example, Microsoft® Windows® 98. The same device power state information may be developed independently, and used in connection with the HAL for the purposes described herein.

While the present invention has been described with respect to a limited number of embodiments, those skilled in the art will appreciate numerous modifications and variations therefrom. It is intended that the appended claims cover all such modifications and variations that fall within the true spirit and scope of the present invention.

What is claimed is:

1. A method for controlling a computer system comprising:
   determining whether a temperature set point has been exceeded;
   if a temperature set point has been exceeded, determining whether a first device is being used;
   if said first device is not being used, determining whether the first device is consuming power; and
   if said first device is consuming power, powering down said first device.

2. The method of claim 1 wherein said powering down step involves powering the device from one operating power consumption state to an operating lower power consumption state.

3. The method of claim 1 wherein said temperature determining step involves monitoring a plurality of temperature sensors and determining whether a set point associated with any of said sensors is exceeded.

4. The method of claim 3 wherein said step of determining whether a first device is being used involves determining whether a first device proximate to a temperature sensor which has exceeded its set point is being used.

5. The method of claim 1 wherein the steps of determining whether a first device is being used and whether said device is consuming power involve using the Advanced Configuration and Power Interface.

6. The method of claim 1 further including using device drivers to power down particular devices.

7. The method of claim 1 further including determining whether it is possible to reduce the operating speed of said first device when a temperature excursion has been detected.

8. The method of claim 1 further including determining whether it is possible to increase cooling.

9. The method of claim 1 further including determining whether there are nonessential devices which can be powered down.

10. The method of claim 1 further including providing a database of devices which consume power when unused and checking said database to determine which devices to check to determine if they are being used.

11. The method of claim 1 further including checking with the operating system before powering down said first device.

12. An article comprising a medium for storing instructions that cause a computer to:
   determine whether a temperature set point has been exceeded;
   if a temperature set point has been exceeded, determine whether a first device is being used;
   if said first device is not being used, determine whether the first device is consuming power; and
   if said first device is consuming power, power down said first device.

13. The article of claim 12 including instructions that cause a computer to power the device down from one operating power consumption state to an operating lower power consumption state.

14. The article of claim 12 including instructions that cause a computer to determine whether a first device is being used and whether said device is consuming power using the Advanced Configuration and Power Interface.

15. The article of claim 12 including instructions that cause a computer to use device drivers to power down particular devices.

16. The article of claim 12 including instructions that cause a computer to check a database of devices that generate heat and to use the database to determine which devices to check to see if they are being used.

17. A method of controlling the temperature inside the housing of a computer component having at least one heat generating device comprising:
   monitoring the temperature inside said component;
   using the Advanced Configuration and Power Interface to determine whether the device can be transitioned to a lower power consumption state; and
   in response to the detection of excessive temperature, transitioning said device to a lower power consumption state.

18. The method of claim 17 further including providing a database of devices which consume power when unused and using said database to select a device to be transitioned to a lower power consumption state.

19. The method of claim 17 wherein said transitioning step involves transitioning the device from one operating power consumption state to an operating lower power consumption state.

20. The method of claim 19 further including checking with an operating system before transitioning the device.

21. An article comprising a medium for storing instructions that cause a computer to:
   monitor the temperature inside a component of a computer system;
   use the Advanced Configuration and Power Interface to determine whether a heat generating device in said component can be transitioned to a lower power consumption state; and
   in response to the detection of excessive temperature, transition said device to a lower power consumption state.

22. The article of claim 21 further including instructions that cause a computer to check a database of components which consume power when unused.

23. A computer system comprising:
   a processor;
   a temperature sensor;
   a medium that stores instructions that cause said processor to:

determine whether said temperature sensor indicates that a temperature limit has been exceeded;

determine whether a first device is being used;

determine whether the first device is consuming power; and powering down said first device.

24. The computer system of claim 23 including a controller connected to said first device that powers down said first device when a temperature limit is exceeded.

25. The system of claim 24 including a device driver that provides instructions to said controller to power down said first device.

26. The system of claim 25 wherein said first device has multiple power on power consumption states.

27. The system of claim 25 including a database containing information about devices that consume power.

28. The system of claim 23 including an operating system, said instructions causing said processor to check with said operating system before powering down said first device.

29. The system of claim 23 including instructions that prevent said first device from being activated to use more power when a temperature limit has been exceeded.

* * * * *